June 29, 1926.
W. L. SCRIBNER
1,590,859
DIFFERENTIATING MINE CAR AXLE
Filed April 1, 1926
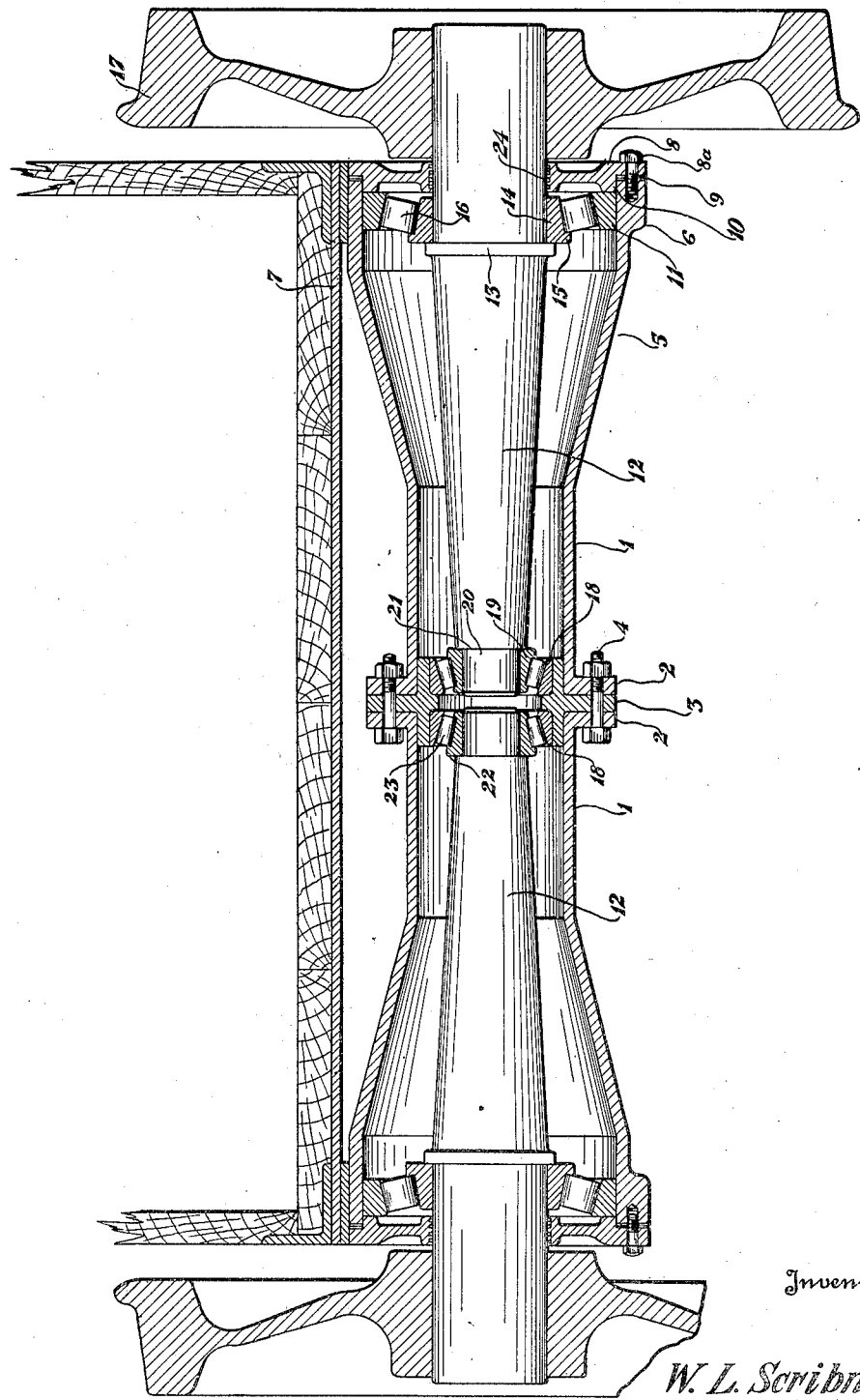
Inventor
W. L. Scribner
By Freast and Bond
Attorneys Patented June 29, 1926.

1,590,859

UNITED STATES PATENT OFFICE.

WILLIAM L. SCRIBNER, OF CANTON, OHIO, ASSIGNOR TO THE TIMKEN ROLLER BEARING COMPANY, OF CANTON, OHIO, A CORPORATION OF OHIO.

DIFFERENTIATING MINE-CAR AXLE.

Application filed April 1, 1926. Serial No. 99,058.

The invention relates to roller bearing axles, especially adapted for use upon mine cars and the like, and more particularly to a differentiating axle which permits the wheels to travel at different speeds, as when passing around a curve.

It is common practice, in the construction of mine cars, and the like, to fix a wheel upon each end portion of an axle; but such an arrangement does not permit of a differential speed in the travel of the wheels as the car passes around a curve, causing one wheel or the other to skid or slide upon the track.

To overcome this objection, cars of this type have been constructed in which each wheel is rotatably mounted upon the axle, but such a construction requires the use of two roller bearings for each wheel and necessitates the removal of the bearings with the wheel, complicating the construction thereof.

In my copending application, Serial No. 76,622, filed December 21, 1925, I disclose a differentiating axle in which only one roller bearing is used for each wheel, the axle being formed of two aligned, independently rotatable sections, to each of which one wheel is fixed; the adjacent ends of the axle sections being journaled in a central bearing sleeve carried within the axle housing.

The object of the present improvement is to provide a differentiating axle which will overcome the objections above referred to and which is an improvement upon the axle disclosed in my copending application above mentioned; the axle being formed in two aligned sections independently rotatable and having their adjacent ends journaled in roller bearings mounted within the axle housing.

An embodiment of the invention is illustrated in the accompanying drawing, in which—

The figure is a longitudinal sectional view of an axle constructed in accordance with the invention.

Similar numerals refer to corresponding parts throughout the drawing.

The axle housing comprises two tubular sections 1, the inner ends of which are provided with peripheral flanges 2 which are connected to the cross flange ring 3 as by the bolts 4.

The outer portion of each section of the axle housing is flared as shown at 5 terminating in the annular flange portion 6 which is connected in any suitable manner to the bottom or floor plate 7 of the car.

A ring 8 is connected, in any suitable manner, as by the bolts 8ᵃ to the end of the flange portion 6 of each axle housing section, shim plates 9 being provided to properly space the same. This ring is provided with an annular flange 10 snugly fitting within the flange portion 6 of the axle housing for contact with the outer end of the cup 11 of a taper roller bearing.

The axle is formed of two aligned, independently rotatable sections 12, each of which is provided with an annular shoulder 13 located within the enlarged outer end portion of the housing and contacting with the inner end of the cone 14 of said taper roller bearing, this cone being provided at its inner end portion with an annular shoulder 15 for engagement with the adjacent ends of the taper rollers 16. Each car wheel 17 is fixed, in any suitable manner, upon the outer end portion of the adjacent axle section.

The cups 18 of a pair of taper roller bearings are mounted within the cross flanged ring 3. The cone 19 of each of these roller bearings is carried upon the reduced inner end portion 20 of the adjacent axle section 12, and in engagement with the annular shoulder 21 thereof. Each of these cones may be provided with the peripheral shoulders 22 for receiving the end thrust of the taper rollers 23.

The interior of the axle housing is preferably filled with grease, and to prevent the same from leaking around the wheel hub, washers 24, of leather or the like, may be carried by the ring 8 and arranged to contact with the axle.

Each wheel is thus fixed upon one independently rotatable section of the axle, the axle sections being journaled, near each end, by means of the taper roller bearings, within the axle housing. Thus a differentiating axle is provided in which each wheel is independently rotatable and carried by an independent axle section journaled at opposite ends in taper roller bearings which take the entire thrust in both directions as well as the radial load.

Both of the inner roller bearing cups are carried within the cross flanged ring thus 110 permitting either axle housing to be removed or replaced without disturbing the cup for the inner roller bearing thereof, the cone and rollers being removed in the usual manner as a unit, with the axle section.

The roller bearings may be adjusted to take up wear by tightening the adjusting bolts in the rings, drawing these rings against the cups of the outer bearings, the proper thickness of shim plates being of course placed in position between the rings and the ends of the axle housing.

I claim:

1. A differentiating axle including a pair of tubular axle housing sections having peripheral flanges at their inner ends, a cross flanged ring located within the inner ends of the axle housing sections and connected to the flanges thereon, a pair of antifriction bearings mounted within said cross flanged ring, a pair of aligned axle sections within the housing having their inner ends journaled in said antifriction bearings, the outer end portion of each axle section being shouldered, a roller bearing cone upon the shouldered portion of each axle section, a roller bearing cup mounted in each outer end portion of the housing, taper rollers between each cooperating cone and cup, and a wheel fixed upon the outer end portion of each axle section.

2. A differentiating axle including a pair of tubular axle housing sections having peripheral flanges at their inner ends, a cross flanged ring located within the inner ends of the axle housing sections and connected to the flanges thereon, a pair of antifriction bearings mounted within said cross flanged ring, a pair of aligned axle sections within the housing having their inner ends reduced and journaled in said antifriction bearings, the outer end portion of each axle section being shouldered, a roller bearing cone upon the shouldered portion of each axle section, a roller bearing cup mounted in each outer end portion of the housing, taper rollers between each cooperating cone and cup, and a wheel fixed upon the outer end portion of each axle section.

3. A differentiating axle including a pair of tubular axle housing sections having peripheral flanges at their inner ends, a cross flanged ring located within the inner ends of the axle sections and connected to the flanges thereon, a pair of antifriction bearings mounted within said cross flanged ring, a pair of aligned axle sections within the housing having their inner ends reduced and journaled in said antifriction bearings, the outer end portion of each axle section being shouldered, a roller bearing cone upon the shouldered portion of each axle section, a roller bearing cup in each outer end portion of the housing, taper rollers between each cooperating cone and cup, a wheel fixed upon the outer end portion of each axle section, a ring in the outer end portion of each axle housing section contacting with the adjacent roller bearing cup and means for adjusting said ring within the housing section.

In testimony that I claim the above, I have hereunto subscribed my name.

WILLIAM L. SCRIBNER.